(12) United States Patent
Kawabata

(10) Patent No.: US 9,264,460 B2
(45) Date of Patent: Feb. 16, 2016

(54) METHOD, APPARATUS, AND SYSTEM FOR EXECUTING A JOB IN COOPERATION WITH A SERVER

(71) Applicant: Hiroyuki Kawabata, Kawanishi (JP)

(72) Inventor: Hiroyuki Kawabata, Kawanishi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 83 days.

(21) Appl. No.: 13/714,641

(22) Filed: Dec. 14, 2012

(65) Prior Publication Data

US 2013/0159536 A1  Jun. 20, 2013

(30) Foreign Application Priority Data

Dec. 16, 2011 (JP) ................................. 2011-275544

(51) Int. Cl.
| | |
|---|---|
| G06F 15/16 | (2006.01) |
| H04L 29/06 | (2006.01) |
| H04L 29/08 | (2006.01) |

(52) U.S. Cl.
CPC .......... H04L 65/1069 (2013.01); H04L 67/141 (2013.01)

(58) Field of Classification Search
CPC . H04L 65/1069; H04L 69/24; H04L 65/1063; H04L 67/141
USPC .................. 358/1.15; 709/227, 245–246, 249
See application file for complete search history.

(56) References Cited

U.S. PATENT DOCUMENTS

| | | | | |
|---|---|---|---|---|
| 6,058,249 A | * | 5/2000 | Matsuda et al. | 358/1.14 |
| 2002/0059455 A1 | * | 5/2002 | Tajiri | H04L 29/06027 709/245 |

(Continued)

FOREIGN PATENT DOCUMENTS

| | | |
|---|---|---|
| JP | 2006-068959 A | 3/2006 |
| JP | 2007-257516 A | 10/2007 |

(Continued)

OTHER PUBLICATIONS

NPL—Office Action issued Nov. 11, 2015 in corresponding Chinese Patent Application No. 201210541482.2 and an English translation thereof (11 pages).*

(Continued)

*Primary Examiner* — Joseph E Avellino
*Assistant Examiner* — Patrick Ngankam
(74) *Attorney, Agent, or Firm* — Buchanan Ingersoll & Rooney PC

(57) ABSTRACT

An image processing device executing a job in cooperation with a server, comprises: an external terminal connecting part for establishing connection with an external terminal; a server connecting part for conducting a negotiation to execute the job with the server and establishing connection with the server in response to receipt of a request from the external terminal; a transmission part for sending information that is received from the external terminal and addressed to the server after rewriting a source address of the information to an address of the image processing device; a screen image control part for outputting screen image information to the external terminal in response to receipt of the screen image information from the server; and a job execution control part for starting execution of the job with the server in accordance with a control command after receiving the control command from the server.

10 Claims, 12 Drawing Sheets

(56) References Cited

U.S. PATENT DOCUMENTS

| | | | |
|---|---|---|---|
| 2004/0100651 A1* | 5/2004 | Leone et al. | 358/1.15 |
| 2005/0200875 A1* | 9/2005 | Sugimoto | B41J 15/042 358/1.13 |
| 2005/0243804 A1* | 11/2005 | Watai | H04L 41/06 370/352 |
| 2010/0118334 A1* | 5/2010 | Iwase | G06F 3/1204 358/1.15 |
| 2011/0019821 A1* | 1/2011 | Kino | 380/255 |
| 2011/0063663 A1* | 3/2011 | Kim | G06F 3/1206 358/1.15 |
| 2011/0216357 A1* | 9/2011 | Kouno | G06F 3/12 358/1.15 |
| 2012/0127502 A1* | 5/2012 | Kim et al. | 358/1.13 |

FOREIGN PATENT DOCUMENTS

| | | |
|---|---|---|
| JP | 2008-33415 A | 2/2008 |
| JP | 2009-89256 A | 4/2009 |
| JP | 2011-28056 A | 2/2011 |
| JP | 2011-130314 A | 6/2011 |

OTHER PUBLICATIONS

Office Action (Decision to Grant a Patent) issued on Feb. 18, 2014, by the Japanese Patent Office in corresponding Japanese Patent application No. 2011-275544, and an English Translation of the Office Action. (6 pages).

Office Action issued Nov. 11, 2015 in corresponding Chinese Patent Application No. 201210541482.2, and an English translation thereof (11 pages).

* cited by examiner

METHOD, APPARATUS, AND SYSTEM FOR EXECUTING A JOB IN COOPERATION WITH A SERVER

This application is based on the application No. 2011-275544 filed in Japan, the contents of which are hereby incorporated by reference.

BACKGROUND OF THE INVENTION

1. Field of the Invention

The present invention relates to an image processing device, an image processing system, an image processing method and a non-transitory computer readable recording medium. The present invention more specifically relates to a technique for the image processing device of executing a job in cooperation with a server.

2. Description of the Background Art

In conventional environments that a plurality of image processing devices are connected through a network, an image processing device serves as a server to establish communication with a wireless terminal and causes the other image processing devices to return from power save mode to stand-by mode in response to a request from the wireless terminal. This known technique is introduced for example in Japanese Patent Application Laid-Open No. JP 2009-89256 A. The image processing device serving as the server sometimes fails to return the other image processing devices to stand-by mode when the image processing device is abruptly powered off. In order to prevent this, according to the conventional technique, after detecting that its main power being turned off, the image processing device selects an alternative image processing device of the plurality of image processing devices that serves as the server while the power is supplied through a supplemental power and returns the selected alternative image processing device to stand-by mode.

On the other hand, conventional image processing devices such as MFPs have been capable of executing jobs in cooperation with a server providing application services. It is assumed that the server provides an OCR (Optical Character Reader) service that extracts characters from image data. For such server, image data generated by reading a document is sent to the server by the image processing device, and a process to extract characters is performed by the server. This series of process is performed in cooperation between the image processing device and the server. The image processing device works together with the server, thereby executing jobs that would not be otherwise possible for the image processing device alone.

This type of image processing device, for example, acquires screen images as to the application services from the server and displays on an operational panel installed on the device body. The user operates the screen image displayed on the operational panel of the image processing device, thereby giving instructions to the server to start the application up and to execute the job in cooperation with the image processing device.

In these days, portable terminals such as smart phones and tablet terminals have become widely popular. The portable terminals have functions including wireless communication function and network communication function. This type of portable terminals will be utilized as well as the operational panel as an external terminal of the image processing device in near future. So, the job execution instruction will be given to the image processing device by remote control.

It becomes difficult for the image processing device and the server to work together normally to execute the job as described above if the portable terminal is used as the external terminal of the image processing device. That is because, the server determines that the access request received from the portable terminal through the network is that from devices other than the image processing device. As a result, the server rejects the request. The plurality of image processing devices may be connected together through the network. Especially in such a case, the server is neither allowed to designate with which image processing device of the plurality of image processing devices the server should be in cooperation nor to determine which command should be used for communication with the image processing device even if there is an access from the portable terminal. The server, therefore, rejects the access request from the device different from the image processing device.

In order to prevent this, when receiving the access request from the portable terminal, for example, the server may cause screen image to make a user select the image processing device with which the server works together or command system for use in communication with the image processing device to be displayed with the portable terminal. A function to make such screen image display needs to be included in the server, and existing servers may not be used. If, however, the server is equipped with such function, an operation load on the server is increased. Also, the server may become less efficient execution of the job in cooperation with the image processing device.

SUMMARY OF THE INVENTION

The present invention is intended to solve the above problems. Thus, the present invention is intended to provide an image processing device, an image processing system, an image processing method and a non-transitory computer readable recording medium capable of causing the image processing device and a server to work together to execute jobs with an external terminal without any modifications to the server that provides application services.

First, the present invention is directed to an image processing device capable of executing a job in cooperation with a server connected through a network.

According to one aspect of the image processing device, the image processing device, comprises: an external terminal connecting part for establishing connection that allows communication with an external terminal; a server connecting part for conducting a negotiation to execute the job in cooperation with the server and establishing connection that allows communication with the server in response to receipt from the external terminal of an access request to the server while connection with the external terminal is established; a transmission part for sending information that is received from the external terminal and addressed to the server after rewriting a source address of the information to an address of the image processing device while connection with the server is established; a screen image control part for outputting screen image information to the external terminal in response to receipt of the screen image information from the server while connection is established with the server; and a job execution control part for starting execution of the job in cooperation with the server in accordance with a control command based on the negotiation after receiving the control command from the server while connection is established with the server.

Second, the present invention is directed to an image processing system comprising an image processing device and a server that work together to execute a job. The image processing device and the server are connected together through a network.

According to an aspect of the image processing system, the image processing device establishes connection that allows communication with an external terminal and sends information addressed to the server from the external terminal to the server after rewriting a source address of the information to an address of the image processing device. The server sends screen image information to operate the job to the image processing device based on the information received from the image processing device, and sends a control command to execute the job in cooperation with the image processing device to the image processing device based on the information received from the image processing device. The image processing device outputs the screen image information to the external terminal in response to receipt of the screen image information from the server, and starts executing the job in cooperation with the server in accordance with the control command after receiving the control command from the server.

Third, the present invention is directed to an image processing method of executing a job in cooperation with a server.

According to an aspect of the image processing method, the image processing method, comprises the steps of: (a) establishing connection that allows communication with an external terminal; (b) conducting a negotiation to execute the job in cooperation with the server and establishing connection that allows communication with the server in response to receipt from the external terminal of an access request to the server while connection with the external terminal is established; (c) sending information that is received from the external terminal and addressed to the server after rewriting a source address of the information to an address of the image processing device while connection with the server is established; (d) outputting screen image information to the external terminal in response to receipt of the screen image information from the server while connection with the server is established; and (e) starting execution of the job in cooperation with the server in accordance with a control command based on the negotiation after receiving the control command from the server while connection with the server is established.

Fourth, the present invention is directed to a non-transitory computer readable recording medium on which a program is recorded. The program is executable on an image processing device that executes a job in cooperation with a server connected through a network.

According to an aspect of the non-transitory computer readable recording medium, the program recorded on the non-transitory computer readable recording medium causes the image processing device to execute the steps of: (a) establishing connection that allows communication with an external terminal; (b) conducting a negotiation to execute the job in cooperation with the server and establishing connection that allows communication with the server in response to receipt from the external terminal of an access request to the server while connection with the external terminal is established; (c) sending information that is received from the external terminal and addressed to the server after rewriting a source address of the information to an address of the image processing device while connection with the server is established; (d) outputting screen image information to the external terminal in response to receipt of the screen image information from the server while connection with the server is established; and (e) starting execution of the job in cooperation with the server in accordance with a control command based on the negotiation after receiving the control command from the server while connection with the server is established.

DESCRIPTION OF THE PRESENT PREFERRED EMBODIMENTS

Figure 1:
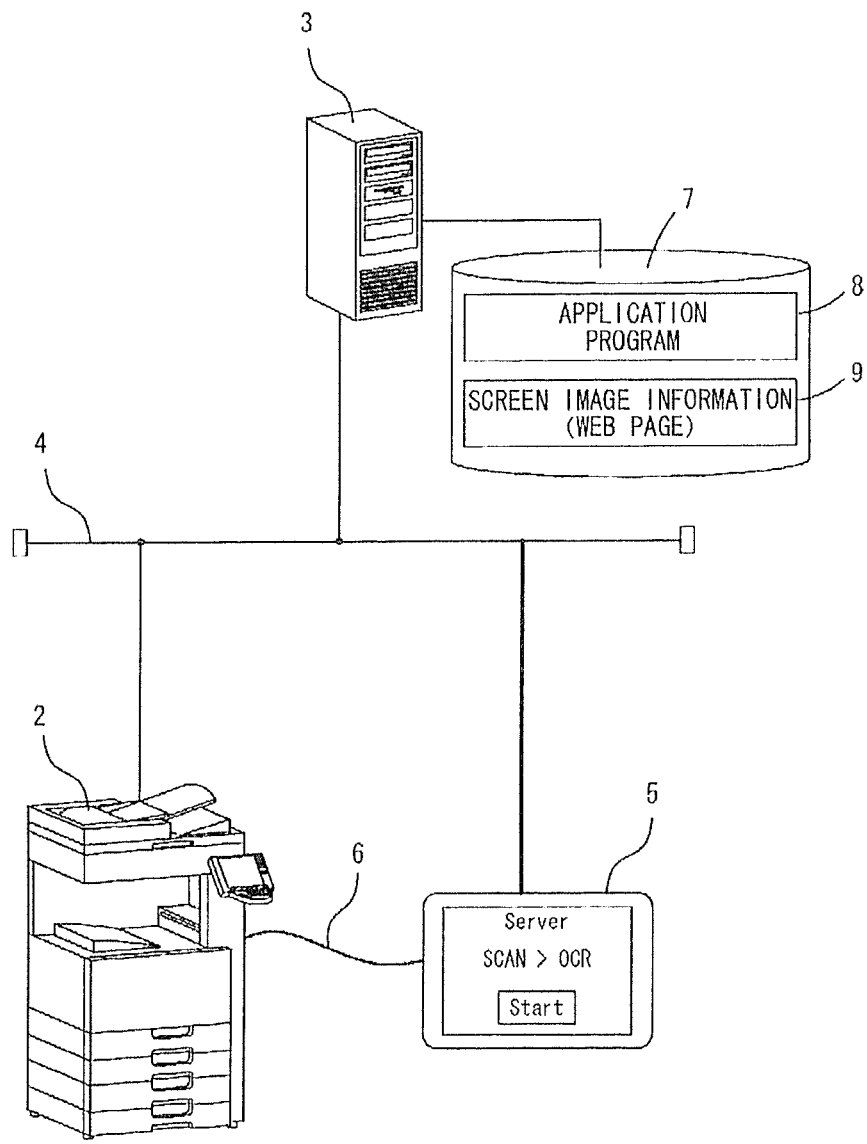
FIG. 1 shows an exemplary configuration of an image processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an image processing system 1 of the present preferred embodiment. The image processing system 1 comprises an image processing device 2 formed from a device such as one of MFPs and a server 3 that provides application services the image processing device 2 alone is not capable of providing. The image processing device 2 and the server 3 are connected with each other through a network 4 such as LAN (Local Area Network). The network 4 may include a wired network that establishes communication via a cable or an optical fiber or a wireless network that establishes communication through radio waves or by infrared rays. A plurality of image processing devices 2 or a plurality of servers 3 may be connected through the network 4.

The image processing device 2 having multiple functions including copy function, scan function, print function, fax function and box function, for example, executes a job after putting the function selected by a user into operation. The image processing device 2 is capable of establishing communication with an external terminal 5 formed from a portable terminal such as a smart phone or a tablet terminal. The image processing device 2 may establish wired communication via a cable 6 such as an USB (Universal Serial Bus) cable as shown in FIG. 1, for example, or wireless communication through radio waves or by infrared rays with the external terminal 5. The image processing device 2 may also establish communication with the external terminal 5 via the network 4.

The image processing device 2 is capable of executing a job in cooperation with the server 3 through communication with the server 3 via the network 4. The job that may not be executed by the image processing device 2 alone, for instance, is executed by the image processing device 2 in cooperation with the server 3.

The server 3 having the function that provides the application service over the network 4 also serves as a web server. The server 3 includes a storage device 7 formed from a nonvolatile storage device such as a hard disk drive (HDD) as illustrated in FIG. 1. The storage device 7 stores therein in advance an application program 8 corresponding to the application service provided with the server 3 installed in advance and screen image information 9 as to screen image for use in operating the application service. A web page in HTML (Hyper Text Markup Language), for instance, is stored as the screen image information 9. A unique address (URL: Uniform Resource Locator) is assigned to the screen image information 9.

The server 3 provides various types of services including a service that generates text data from input image data by OCR processing to the image data, a service that automatically generates translated data by translating the text data generated with the OCR service, or a service that converts the image data in a specific data format to another data format, for example. The server 3 executes the application program 8, thereby performing the process corresponds to the above-mentioned service in cooperation with the operation of the image processing device 2.

The server 3 sends and receives a predetermined control command from the image processing device 2, for instance, to confirm that the image processing device 2 to be the another side of communication is a device capable of working together. When the device to be the another side of communication is the image processing device 2 capable of working together with the server 3 is successfully confirmed, the server 3 starts executing the application program 8. After starting execution of the application program 8, the server 3 proceeds with the process corresponds to the service in cooperation with the image processing device 2. When failing to confirm that the device to be the another side of communication is the image processing device 2 capable of working together with the server 3, the server 3 does not executes the application program 8.

Figure 2:
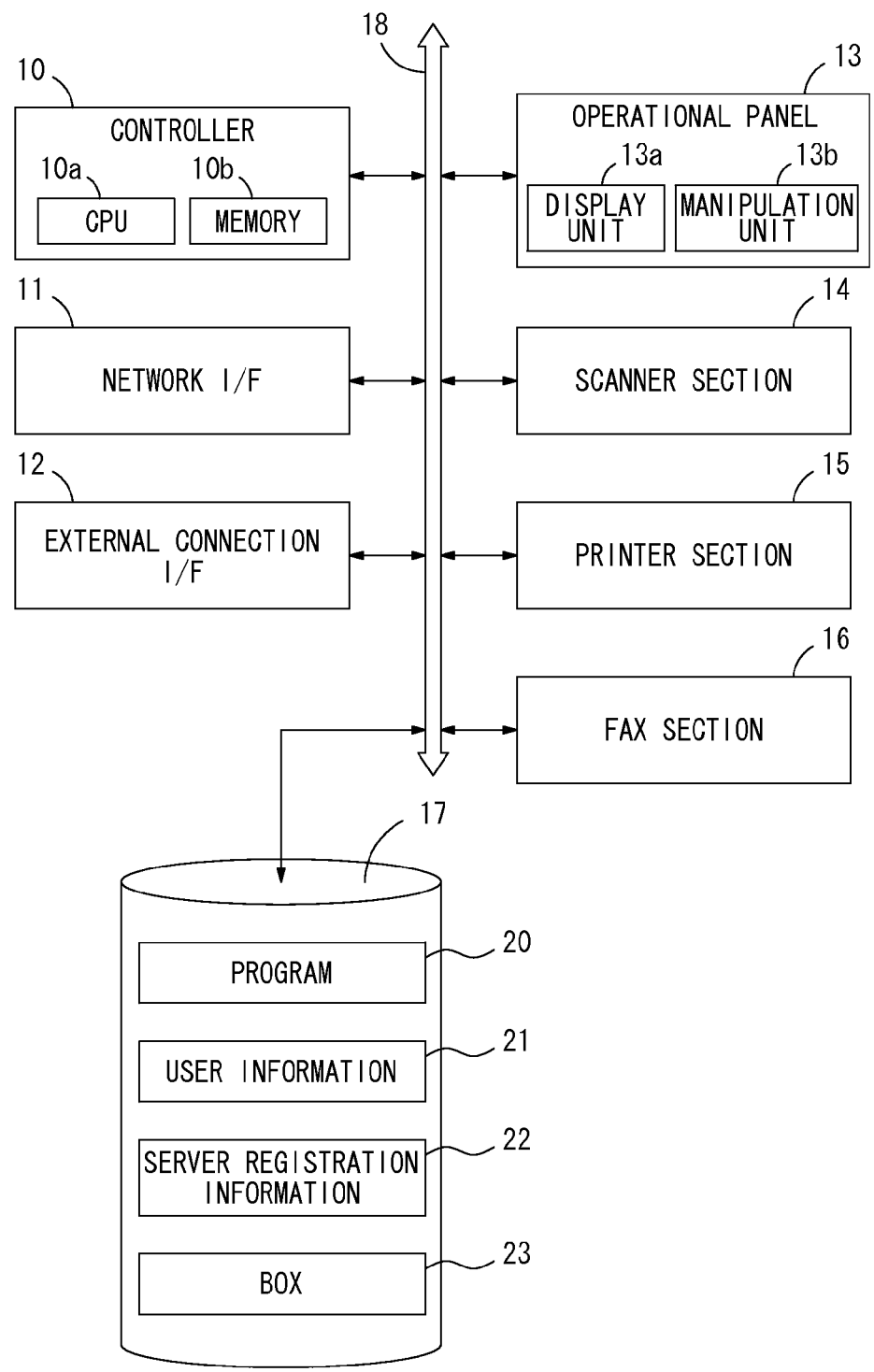
FIG. 2 is a block diagram showing an exemplary hardware configuration of an image processing device.

FIG. 2 is a block diagram showing an exemplary hardware configuration of the image processing device 2. The image processing device 2 includes a controller 10, a network interface 11, an external connection interface 12, an operational panel 13, a scanner section 14, a printer section 15, a fax section 16 and a storage device 17 that are connected to each other through a bus 18.

The controller 10 includes a CPU 10a and a memory 10b. The CPU 10a executes a program 20 installed in advance on the storage device 17, thereby becoming operative to function as each processing part described later. The memory 10b stores therein data such as temporary data required in accordance with execution of the program 20 by the CPU 10a.

The network interface 11 is for connecting the image processing device 2 to the network 4. The image processing device 2 establishes communication with the server 3 via the network interface 11.

The external connection interface 12 is a communication interface for establishing wired or wireless communication with the external terminal 5. When the image processing device 2 establishes communication through the network 4 with the external terminal 5 connected to the network 4, the external connection interface 12 is not used. In such a case, the image processing device 2 establishes communication with the external terminal 5 via the above-described network interface 11.

The operational panel 13 is a user interface operable by a user in use of the image processing device 2. When the user directly operates the image processing device 2 without using the external terminal 5, he or she operates the operational panel 13. The operational panel 13 includes a display unit 13a on which various types of information is displayed to the user and a manipulation unit 13b which receives entries by the user. The display unit 13a is formed from a device such as a color liquid crystal display, and the manipulation unit 13b is formed with parts such as touch panel sensors arranged on the screen of the display section 13a, for example.

The scanner section 14 reads image of a document placed by the user one-by-one and generates image data. The scanner section 14 is activated in response to execution of a scan job on the image processing device 2, for example, to read the document. The printer section 15 forms the input image data and produces a printed output. The printer section 15 is activated in response to execution of a print job on the image processing device 2, for example, to form the image on a printing sheet and produce the printed output. The fax section 16 transmits and receives fax data through public phone lines, which are not shown in FIG. 2.

The storage device 17 is formed from a nonvolatile storage device such as a hard disk drive (HDD). The storage device 17 stores therein the program 20 executed by the CPU 10a, user information 21 and server registration information 22. Information about the user who uses the image processing device 2 is registered as the user information 21, and information as to the server 3 is registered as the server registration information 22. The storage device 17 includes at least one BOX 23 storing therein data such as image data as a storage region used in response to BOX function.

The information to save identification information such as user ID or password of the user who is authorized to use the image processing device 2 is registered as the user information 21. As the information as to the server 3, the server registration information 22 contains information such as an address (including URL or IP address) to access the server 3, information of the application provided by the server 3 and information relating to the control command including SOAP (Simple Object Access Protocol) command sent and received in job execution in cooperation with the server 3, for example.

The SOAP is a protocol that executes a remote procedure call (RPC) for reading a program or data stored in another side of the communication between the image processing device 2 and the server 3 and/or for allowing the another side of the communication to execute a predetermined procedure. The image processing device 2 and the server 3 exchanges to each other commands and/or messages based on the SOAP, thereby allowing both of them to specify based on an instruction from the another side of the communication the predetermined procedure which should be executed.

Figure 3:
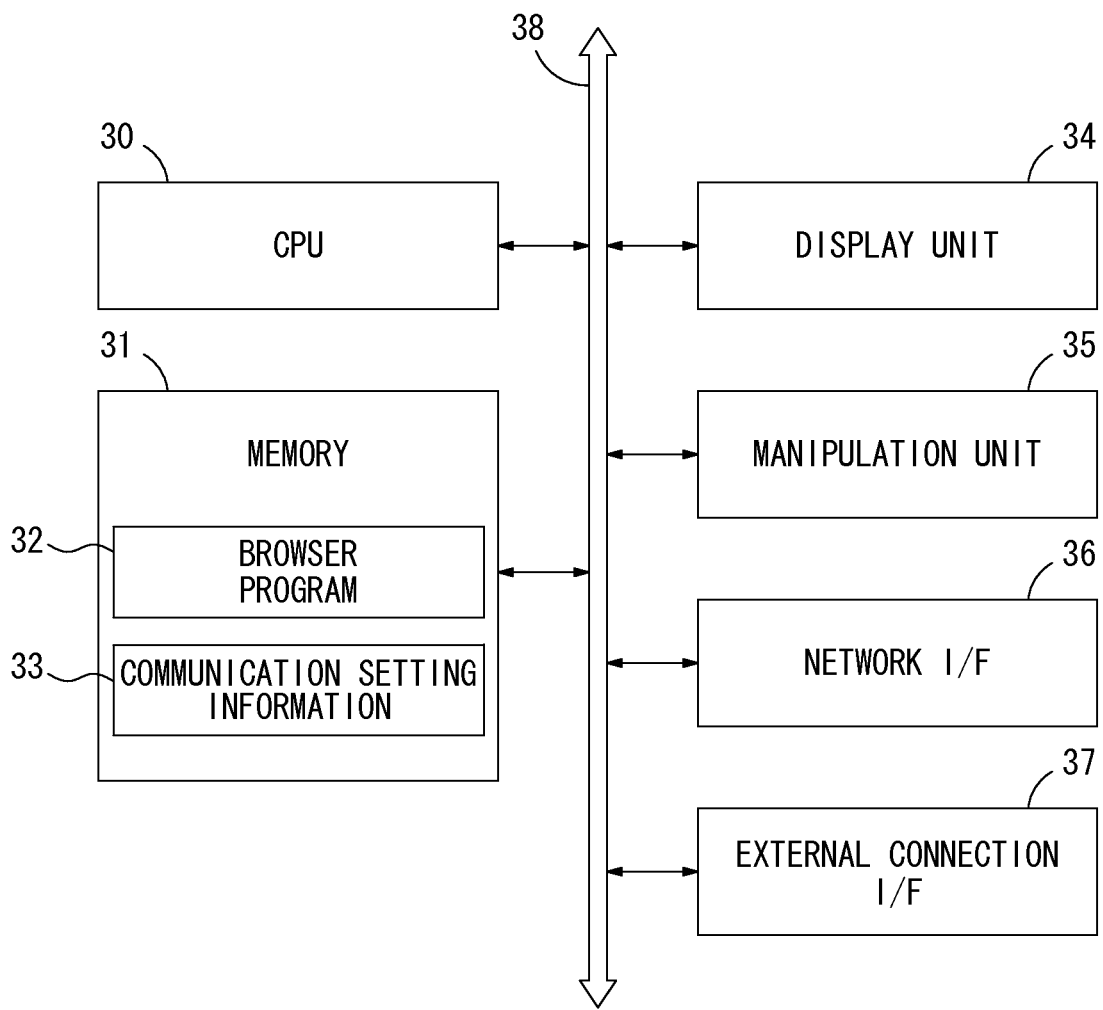
FIG. 3 is a block diagram showing an exemplary hardware configuration of an external terminal.

FIG. 3 is a block diagram showing an exemplary hardware configuration of the external terminal 5. The external terminal 5 includes a CPU 30, a memory 31, a display unit 34, a manipulation unit 35, a network interface 36 and an external connection interface 37 that are connected to each other through a bus 38.

The CPU 30 executes a variety of programs. The memory 31 is a nonvolatile storage unit formed from, for instance, a solid-state drive (SSD) stores therein data including a browser program 32 and communication setting information 33. The memory 31 stores therein operating systems such as ANDROID (trademark) executed by the CPU 30 and/or other types of data besides the above-mentioned data.

The display unit 34 is formed from a device such as a color liquid crystal display. The manipulation unit 35 is formed with parts such as touch panel sensors arranged on the screen of the display unit 34. The network interface 36 is for connecting the external terminal 5 to the network 4. The external connection interface 37 is a communication interface for the external terminal 5 to establish wired or wireless communication with the image processing device 2. When the external terminal 5 establishes communication through the network 4 with the image processing device 2, the external connection interface 37 is not used. In such a case, the external terminal 5 establishes communication with the image processing device 2 via the network interface 36.

The CPU 30 starts the operating system up as the external terminal 5 is powered on. In response to the instruction to start the browser program 32 up given by the user after the startup of the operating system, the CPU 30 reads and executes the browser program 32 in the memory 31. A browser then becomes operative on the external terminal 5. The browser reads the communication setting information 33 in the memory 31 and accesses the destination configured in the communication setting information 33. The browser then accesses the address (URL) designated by the user via the destination and acquires screen image information from the address to display the acquired screen image on the display unit 34.

The communication setting information 33 in the memory 31 contains information, for example, configuring whether or not that the browser accesses an internet or the like via a predetermined relay server (proxy server). When the information to access via the relay server is configured, information such as an address (for instance, an IP address) to identify the relay server is further contained. More specifically, if the information as to the relay server is contained in the communication setting information 33, the browser identifies the destination based on the contained information and acquires information such as screen image information via the destination.

On the image processing system 1 of the present preferred embodiment configured as described above, the image processing device 2 serves as the relay server of the external terminal 5. After receiving the request such as the access request for the server 3 from the external terminal 5, the image processing device 2 conducts negotiation with the server 3 to execute the job in cooperation with each other and establishes connection that allows communication with the server 3 using the predetermined control command. The image processing device 2 is configured to rewrite the request from the external terminal 5 to that from the image processing device 2 itself and send to the server 3, which is not just forwarding it to the server 3. The image processing device 2 is explained more in detail below.

Figure 4:
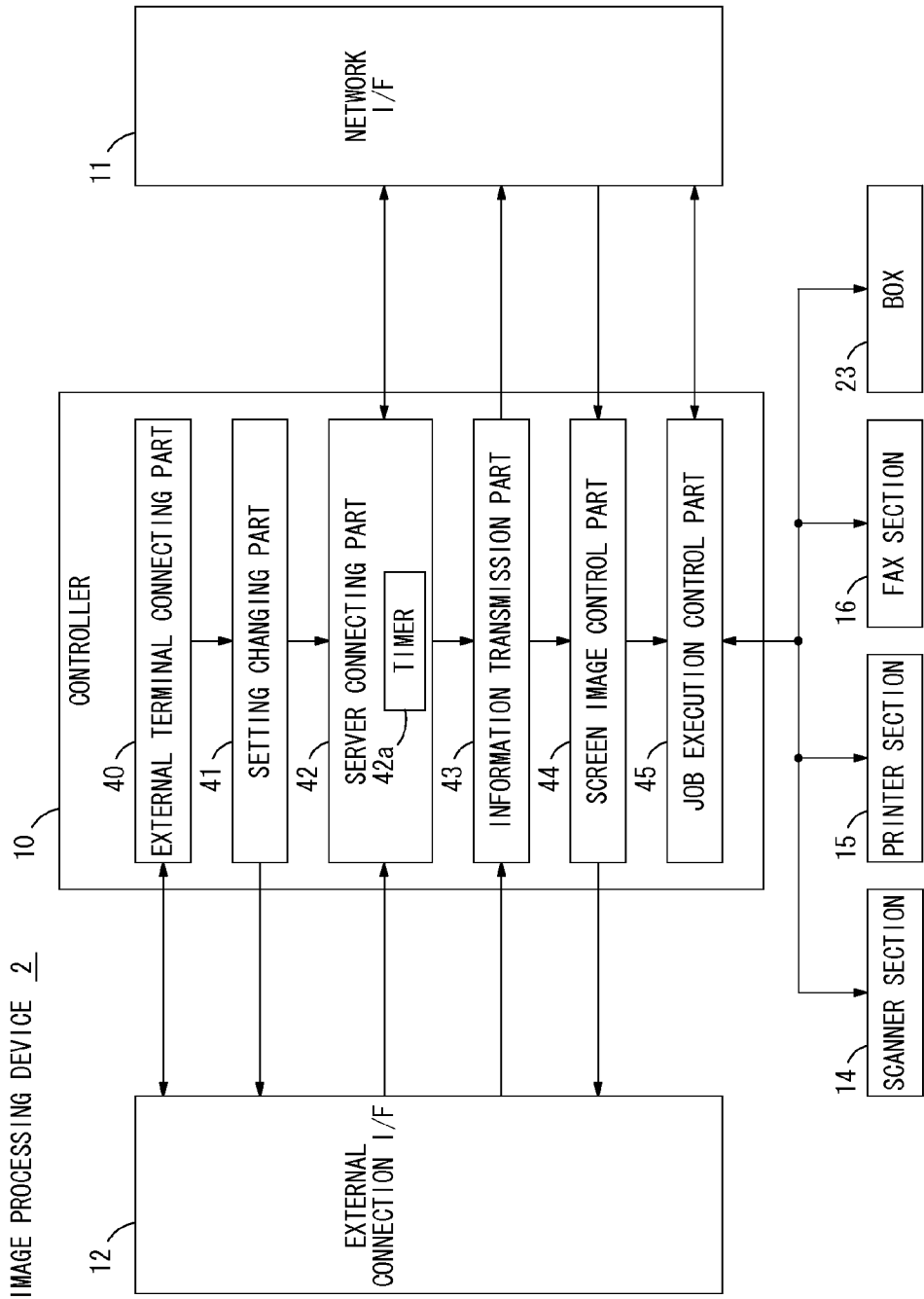
FIG. 4 is a block diagram showing the functional configuration of the image processing device.

FIG. 4 is a block diagram showing the functional configuration of the image processing device 2. The above-mentioned controller 10 serves as an external terminal connecting part 40, a setting changing part 41, a server connecting part 42, an information transmission part 43, a screen image control part 44 and a job execution control part 45 as illustrated in FIG. 4 realized by execution of the program 20 by the CPU 10a.

The external terminal connecting part 40 establishes connection that allows communication with the external terminal 5. When the image processing device 2 establishes communication with the external terminal 5 through the cable 6, for example, the external terminal connecting part 40 detects that the cable 6 is connected to the external connection interface 12 and establishes the connection with the external terminal 5 that allows communication therebetween via the external connection interface 12. When the image processing device 2 establishes wireless communication with the external terminal 5, the external terminal connecting part 40 detects that the wireless communication with the external terminal 5 has become allowed, and establishes connection with the external terminal 5 that allows communication therebetween through the external connection interface 12. The image processing device 2 sometimes establishes communication with the external terminal 5 through the network 4. In such a case, as receiving the connection request from the external terminal 5 via the network interface 11, the external terminal connecting part 40 establishes connection with the external terminal 5 that allows communication therebetween through the network interface 11 based on the received connection request. The external terminal connecting part 40 shown in FIG. 4 establishes connection with the external terminal 5 that allows communication therebetween through the external connection interface 12.

For establishing connection with the external terminal 5, the external terminal connecting part 40 may perform user authentication of the user who uses the external terminal 5. The request for transmission of the user information such as a user ID and/or a password is sent to the external terminal 5 and the external terminal 5 responds to the request by sending the user information, for instance. In this case, the received user information is cross-checked with the user information 21 stored in advance in the storage device 17. If the information matched as a result of cross-checking, the user of the external terminal 5 is identified to be a normal user. So, the external terminal connecting part 40 may maintain connection with the external terminal 5. If the information did not match as a result of cross-checking, the user of the external terminal 5 is not identified to be a normal user. The external terminal connecting part 40 disconnects from the external terminal 5.

The setting changing part 41 changes the settings of the communication setting information 33 stored in the external terminal 5 while connection with the external terminal 5 is established by the external terminal connecting part 40. To be more specific, after connection with the external terminal 5 is established, the setting changing part 41 gives an instruction to the external terminal 5 to configure the image processing device 2 as the relay server. The external terminal 5 then updates the setting configuring the relay server in the communication setting information 33 in response to the instruction from the setting changing part 41. So, when accessing the network 4, the external terminal 5 accesses via the image processing device 2. The setting changing part 41 may access directly the communication setting information 33 stored in the external terminal 5 to update the setting configuring the relay server in the communication setting information 33.

After the setting changing part 41 updates the communication setting information 33 in the external terminal 5 as described above, the external terminal 5 establishes communication over the network 4 via the image processing device 2. Therefore, all the packets, for example, transmitted from the external terminal 5 are delivered over the network 4 via the image processing device 2. The image processing device 2 is allowed to monitor all the information transmitted from the external terminal 5.

The server connecting part 42 determines the information received from the external terminal 5 while connection is established with the external terminal 5. The server connecting part 42 establishes connection with the server 3 that allows communication therebetween when the received information is determined to be the access request to the server 3 that works together with the image processing device 2. As receiving the information from the external terminal 5, the server connecting part 42 determines whether or not the destination of the information is the address of the server 3 registered as the server registration information 22.

When the destination of the information received from the external terminal 5 matches the address of the server 3, the server connecting part 42 conducts negotiation to execute the job in cooperation with the server 3, thereby establishing connection that allows communication with the server 3. The server connecting part 42 sends a predetermined control command with the SOAP command registered as the server registration information 22 to the server 3. It is considered by receiving a normal response command from the server 3 that the negotiation to execute the job in cooperation between the image processing device 2 and the server 3 is conducted normally. The server connecting part 42 then establishes connection that allows communication with the server 3. As such negotiation is complete normally, the application program 8 is started up on the server 3 and the application provided by the server 3 runs.

When the information sent to the device other than the server 3 is received from the external terminal 5, the server connecting part 42 does not perform the above-described process and does not establish connection with the server 3. If the connection with the server 3 has already been established, the server connecting part 42 maintains the connection.

The server connecting part 42 is provided with a timer 42*a* as show in FIG. 4. The timer 42*a* measures a time that elapses before receiving the information to send to the server 3 from the external terminal 5 while connection with the server 3 is established. As a predetermined period of time is measured by the timer 42*a*, the server connecting part 42 automatically disconnects the connection with the server 3. The server 3, therefore, stops running of the application.

The plurality of image processing devices 2 may be connected to some networks 4, for example. With such network 4, the server 3 may establish connection with the plurality of image processing devices 2 at a time. In such a case, the server 3 has multiply executed the same application. The large operation load is applied on the server 3 to multiply execute the application. In the present preferred embodiment, in response to elapse of the predetermined period of time before receiving the information to send to the server 3 from the external terminal 5, the image processing device 2 automatically deletes the connection with the server 3, thereby reducing the operation load on the server 3.

FIG. 4 shows an example where the timer 42*a* is provided as a part of the functions on the server connecting part 42. The timer 42*a*, however, is not necessarily provided as the part of the functions on the server connecting part 42. The timer 42*a* may be provided as a separate function from the server connecting part 42.

The information transmission part 43 sends the information such as a variety of requests or data received from the external terminal 5 over the network 4 via the network interface 11. The information transmission part 43 rewrites the source address contained in the information received from the external terminal 5 from the address of the external terminal 5 to the address of the image processing device 2. The information transmission part 43 sends the information with the updated source address over the network 4. The information transmission part 43 rewrites the source address contained in the information received from the external terminal 5 from the address of the external terminal 5 to the address of the image processing device 2 regardless of whether the destination of the information received from the external terminal 5 is the server 3. As a result, the image processing device 2 is allowed to receive the reply to the sent information from the destination after sending the information received from the external terminal 5 over the network 4.

The screen image control part 44 outputs screen image information such as a web page to the external terminal 5 in response to acquisition of the screen image information as the reply to the information sent by the information transmission part 43 after rewriting the source address. The screen image information 9 as to an operation screen image for the job to be executed in cooperation between the server 3 and the image processing device 2 is acquired while the connection with the server 3 is established. In response to the acquisition of the screen image information 9, the screen image control part 44 outputs the acquired screen image information 9 to the external terminal 5, thereby causing the web page corresponding to the screen image information 9 to be displayed on the display unit 34 of the external terminal 5.

The user of the external terminal 5 operates the manipulation unit 35 with the web page based on the screen image information 9 sent to the server 3 being displayed on the display unit 34. The user then is allowed to configure settings of the job executed in cooperation between the server 3 and the image processing device 2 and/or to give the job execution instruction. In response to the operation to the external terminal 5, the external terminal 5 sends the operation information to the image processing device 2. After the image processing device 2 receives the operation information, the above-described information transmission part 43 rewrites the source address of the operation information every time it is received and sends to the server 3.

After receiving the information from the image processing device 2, the server 3 analyzes the information every time it receives the information. When the information received from the image processing device 2 is the screen image request asking for another web page, the server 3 sends the screen image information 9 corresponds to the request to the image processing device 2. When the information received from the image processing device 2 is the job execution instruction, the server 3 sends and receives the control command with the SOAP from the image processing device 2, thereby starting execution of the job in cooperation with the image processing device 2.

The job execution control part 45 controls execution of the job based on the control command in response to receipt of the control command from the server 3. The job execution control part 45 controls the scanner section 14, the printer section 15, the fax section 16 and the BOX 23, thereby executing the job specified with the control command from the server 3.

It is explained next, for example, that a job generates image data by reading a document on the image processing device 2 and converts the image data to text data with OCR process to the image data on the server 3. For the job, the image processing device 2 executes a scan job in response to the instruction by the server 3. More specifically, the image data is generated by reading the document. The image processing device 2 then sends the generated image data to the server 3. After receiving the image data from the image processing device 2, the server 3 extracts characters from the image data and generates the text data. The server 3 sends the text data to the destination designated in advance by the user of the external terminal 5. The image processing device 2 and the server 3 works together, and execution of the job specified by the user of the external terminal 5 is allowed.

Figure 5:
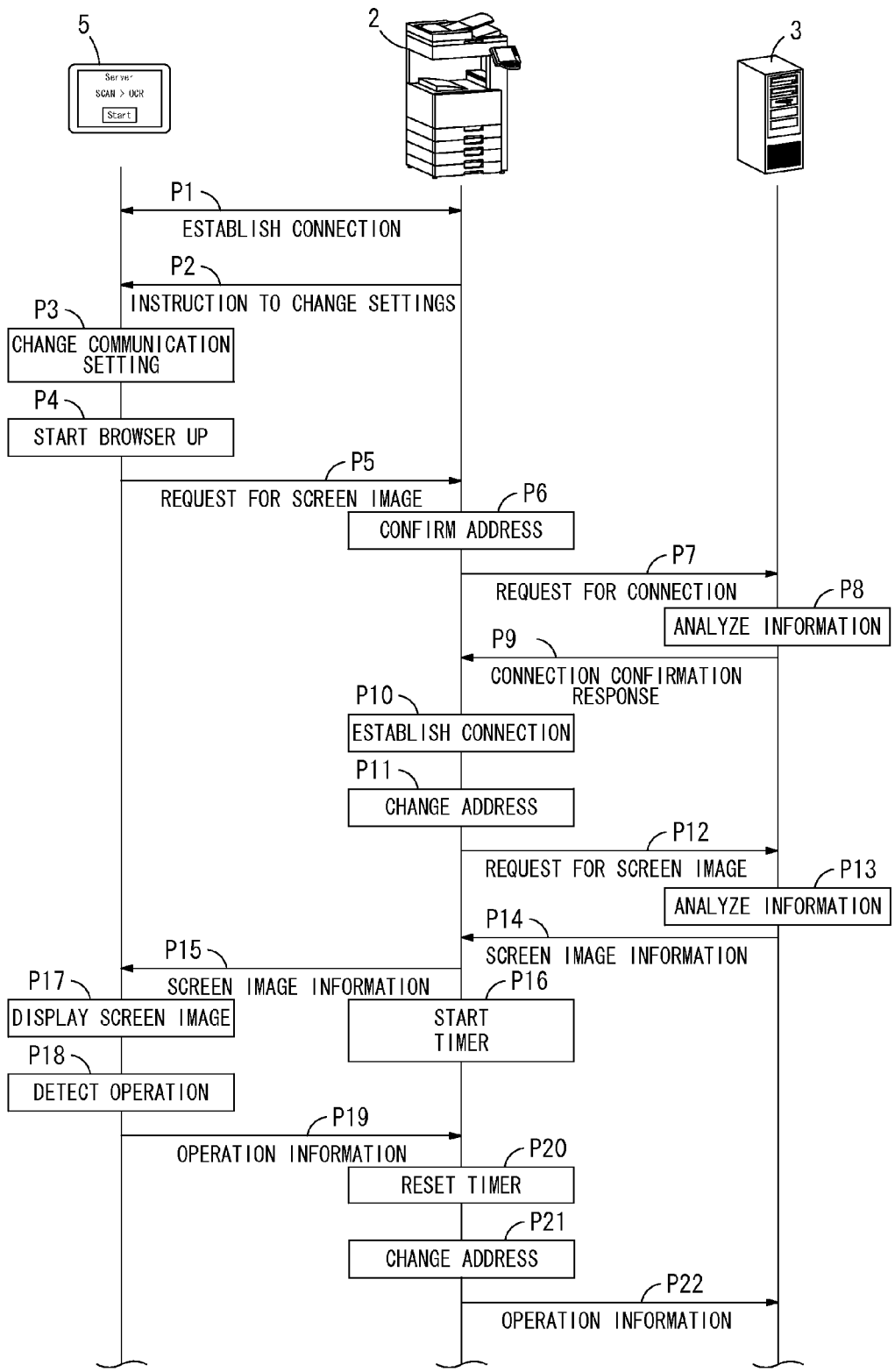
FIG. 5 is a sequence diagram showing the process performed in series on the image processing system.
Figure 6:
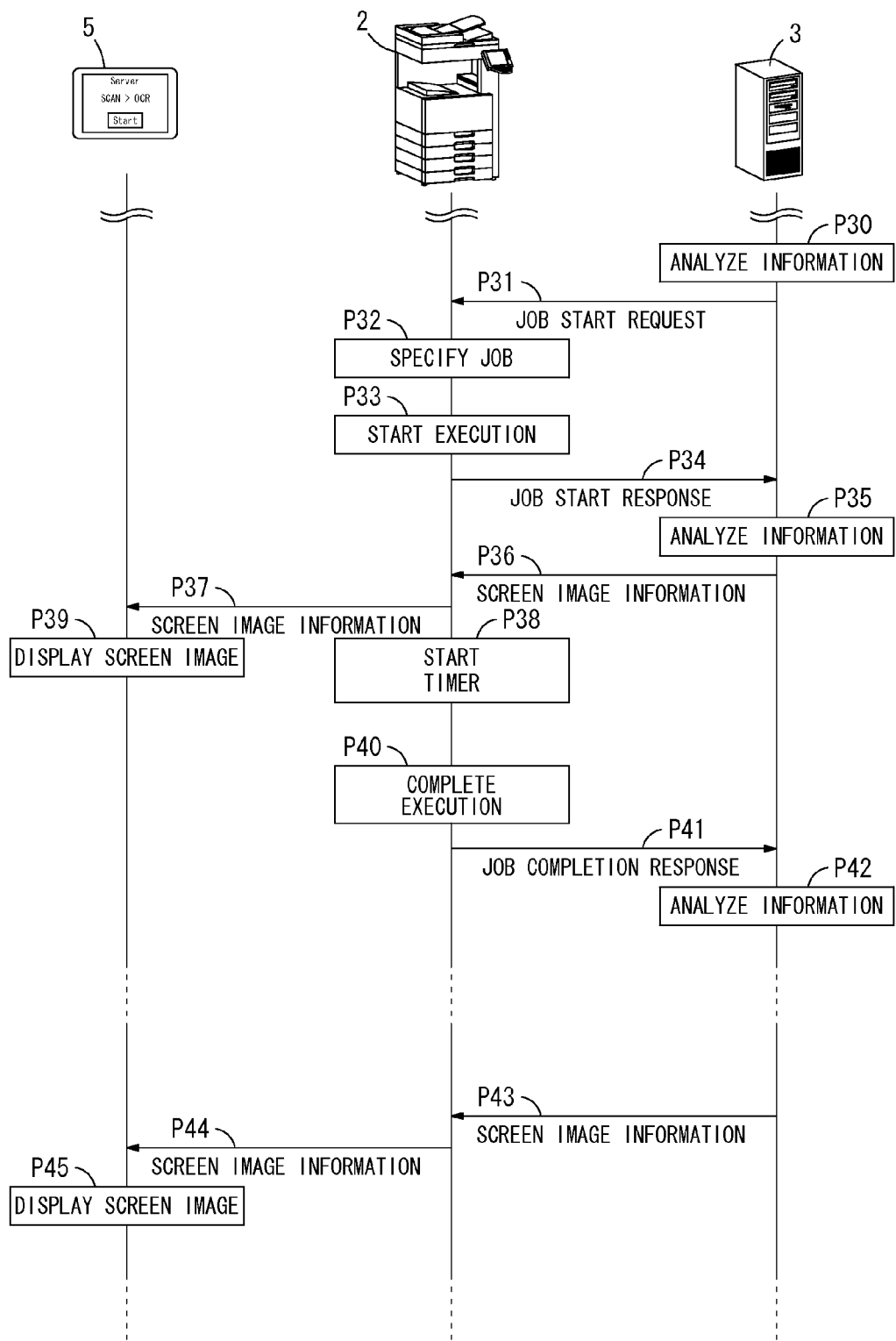
FIG. 6 is a sequence diagram showing the process performed in series on the image processing system.
Figure 7:
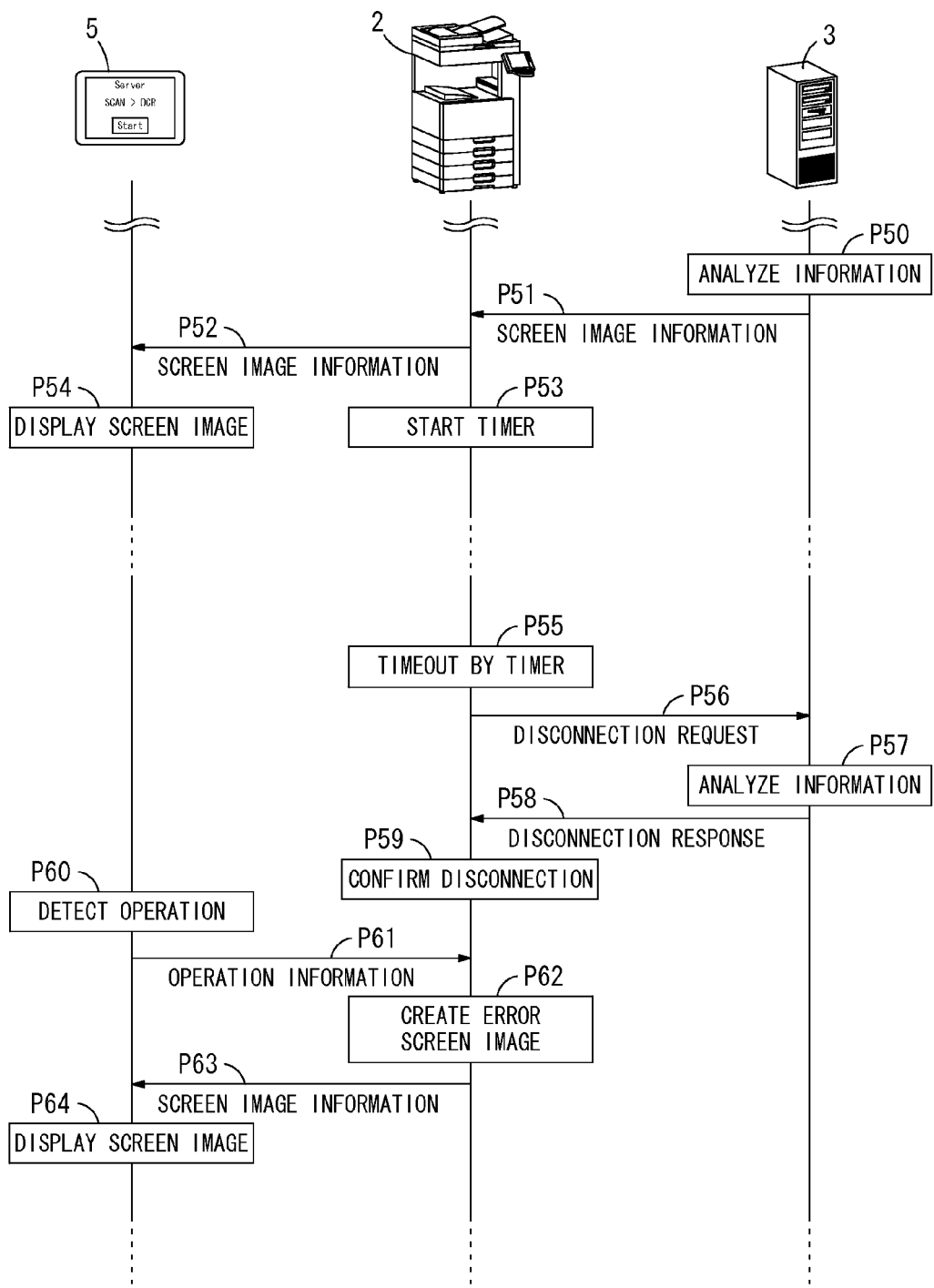
FIG. 7 is a sequence diagram showing the process performed in series on the image processing system.

Process sequence where the image processing device 2 and the server 3 work together on the image processing system 1 of the present preferred embodiment is explained. FIGS. 5, 6 and 7 are sequence diagrams showing process performed on the image processing system 1 in series.

FIG. 5 is a sequence diagram showing that the external terminal 5 accesses the server 3 via the image processing device 2 to make the operation as to the application service provided by the server 3 enable by the external terminal 5. As shown in FIG. 5, after establishing connection with the external terminal 5 (process P1), the image processing device 2 sends an instruction to change the settings in the communication setting information 33 to the external terminal 5 (process P2). The image processing device 2 notifies the external terminal 5 of the address (URL) to access the server 3 together with the setting change instruction.

As receiving the setting change instruction from the image processing device 2, the external terminal 5 rewrites the communication setting information 33 and configures the image processing device 2 as the relay server (process P3). The external terminal 5 then starts the browser up in response to the user's instruction (process P4) and sends the screen image request to the address (URL) designated by the user (process P5). The communication setting information 33 in the external terminal 5 has been updated to configure the image processing device 2 as the relay server. So, the external terminal 5 sends the screen image request to the image processing device 2. The screen image request send by the external terminal 5 is based on HTTP (HyperText Transfer Protocol).

In response to receipt of the screen image request from the external terminal 5, the image processing device 2 confirms the destination address (URL) of the screen image request (process P6). When the destination address is the address of the server 3, the image processing device 2 sends the connection request with the SOAP command to the server 3 (process P7).

As receiving the connection request from the image processing device 2, the server 3 analyzes the information (process P8). After confirming that the received information is the connection request with the SOAP command, the server 3 executes the application program 8 to start the application up and sends the connection confirmation response to the image processing device 2 with the SOAP command (process P9).

The image processing device 2 is allowed to determine that the application is running on the server 3 by receiving the connection confirmation response from the server 3. The image processing device 2 then establishes connection with the server 3 (process P10). The image processing device 2 rewrites the source address (for example, IP address) of the screen image request received in process P5 to the address of the image processing device 2 from the address of the external terminal 5 (process P11) and sends the updated screen image request to the server 3 (process P12).

The server 3 analyzes the information every time it receives the information from the image processing device 2 with which the server 3 is connected (process P13). When the received information contains the address of the image processing device 2 as the source address, the server 3 determines whether the information is based on HTTP or SOAP. If the received information is the screen image request based on HTTP, the server 3 reads the screen image information 9 corresponds to the screen image request and sends to the image processing device 2 (process P14).

As acquiring the screen image information 9 from the server 3, the image processing device 2 sends the acquired screen image information 9 to the external terminal 5 (process P15). The image processing device 2 starts measuring a time with the above-described timer 42*a* in response to sending of the screen image information 9 (process P16).

After acquiring the screen image information 9 from the image processing device 2, the external terminal 5 causes the screen image to be displayed on the display unit 34 based on the acquired screen image information 9 (process P17). The running browser on the external terminal 5 performs screen image display process. In response to detection of user's operation (process P18), the external terminal 5 sends the operation information corresponds to the user's operation to the image processing device 2 (process P19). The operation information thereby sent is based on HTTP as similar to the above-described case.

In response to receipt of the operation information from the external terminal 5, the image processing device 2 stops measuring a time and resets the measured time before receiving the operation information (process P20). The image processing device 2 rewrites the source address of the operation information received from the external terminal 5 to the address of the image processing device 2 from the address of the external terminal 5 (process P21) and sends the updated operation information to the server 3 (process P22). The server 3 then analyzes the information received from the image processing device 2 and performs the process in accordance with the analysis result.

FIG. 6 is a sequence diagram showing that the image processing device 2 and the server 3 work together to execute the job based on the operation information received from the external terminal 5. As shown in FIG. 6, the server 3 analyzes the information received from the image processing device 2 (process P30). When the server 3 determines that the received information is the job execution instruction based on HTTP as a result of the analysis, the server 3 sends the job start request with the SOAP command to the image processing device 2 (process P31).

In response to receipt of the control command using SOAP from the server 3, the image processing device 2 performs the process in accordance with the control command. To be more specific, as receiving the job start request with the SOAP command from the server 3, the image processing device 2 specifies the job to execute (process P32) and starts executing the specified job (process P33). In case of scan job, for instance, the image processing device 2 controls the scanner section 14 to start reading the document. As starting the execution of the job, the image processing device 2 sends the job start response with the SOAP command to the server 3 (process P34).

After receiving the job start response from the image processing device 2, the server 3 analyzes the received information. The server 3 is then allowed to determine that execution of the job is normally started on the image processing device 2 (process P35). The server 3 reads the screen image information 9 showing that the job specified by the user is in execution and sends the read screen image information 9 to the image processing device 2 (process P36).

As receiving the screen image information 9 from the server 3, the image processing device 2 outputs the received screen image information 9 to the external terminal 5 (process P37). The image processing device 2 starts measuring a time with the above-described timer 42*a* in response to the output of the information (process P38).

After acquiring the screen image information 9 from the image processing device 2, the external terminal 5 causes the screen image to be displayed on the display unit 34 based on the acquired screen image information 9 (process P39). The user of the external terminal 5 is then allowed to know that execution of the job in cooperation between the image processing device 2 and the server 3 has started.

When execution of the job specified by the server 3 is complete (process P40), the image processing device 2 sends to the server 3 the job completion response with the SOAP command (process P41).

After receiving the job completion response from the image processing device 2, the server 3 analyzes the received information, thereby determining that execution of the job is complete on the image processing device 2 (process P42). The server 3 then sends and receives the SOAP command from the image processing device 2, thereby working together with the image processing device 2 to complete execution of the job specified by the user. As completing execution of the job in cooperation with the image processing device 2, the server 3 reads the screen image information 9 showing that execution of the job specified by the user is complete and sends the read screen image information 9 to the image processing device 2 (process P43).

After receiving the screen image information 9 from the server 3, the image processing device 2 outputs the received screen image information 9 to the external terminal 5 (process P44) and causes the external terminal 5 to display (process P45). The user of the external terminal 5 is allowed to know that execution of the job in cooperation between the image processing device 2 and the server 3 is complete.

FIG. 7 is a sequence diagram showing that the predetermine period of time elapses without receiving any information from the external terminal 5 after the screen image information is sent to the external terminal 5 by the image processing device 2. As shown in FIG. 7, the server 3 analyzes the information from the image processing device 2 (process P50). When it is determined as a result of the analysis that the received information is the screen image request based on HTTP, the server 3 sends the screen image information 9 to the image processing device 2 (process P51).

After receiving the screen image information 9 from the server 3, the image processing device 2 outputs the received screen image information 9 to the external terminal 5 (process P52). The image processing device 2 starts measuring a time with the above-described timer 42a in response to the output of the information (process P53). After acquiring the screen image information 9 from the image processing device 2, the external terminal 5 causes the screen image to be displayed on the display unit 34 based on the acquired screen image information 9 (process P54).

In cases where the external terminal 5 is unattended and left by the user of the external terminal 5, the predetermined period of time is measured and a timeout is detected by the timer 42a of the image processing device 2 without receiving the information from the external terminal 5 (process P55). As the timeout is detected by the timer 42a, the image processing device 2 sends to the server 3 the disconnection request with the SOAP command (process P56).

The server 3 analyzes the information after receiving the disconnection request and determines that the received information is the request to delete the connection between the image processing device 2 and the server 3 (process P57). The server 3 then sends the disconnection response with the SOAP command to the image processing device 2 (process P58). The server 3 completes the application which was started up in response to the establishment of the connection with the image processing device 2.

In response to receipt of the disconnection response with the SOAP command from the server 3 as the reply to the disconnection request, the image processing device 2 confirms that the connection with the server 3 is deleted (process P59).

The user of the external terminal 5 may return, for example, and make operations to the display screen image displayed in process P54. In such a case, the external terminal 5 detects the operation made by the user of the external terminal 5 (process P60). The external terminal 5 sends the operation information based on HTTP to the image processing device 2 (process P61). The image processing device 2, however, has already deleted the connection with the server 3 at this point of time. The image processing device 2, therefore, creates error screen image showing the timeout with the above-described screen image control part 44 (process P62) and sends the screen image information corresponds to the error screen image to the external terminal 5 (process P63). After acquiring the screen image information corresponds to the error screen image from the image processing device 2, the external terminal 5 causes the error screen image to be displayed on the display unit 34 based on the acquired screen image information (process P64). The user is allowed to know that the connection between the image processing device 2 and the server 3 has been deleted because of the timeout by seeing the displayed error screen image.

As described above, on the image processing system 1 of the present preferred embodiment, even when the user makes operations through the external terminal 5, the image processing device 2 relays the information from the external terminal 5 to the server 3, so that the job is allowed to be executed in cooperation between the image processing device 2 and the server 3. Especially in the present preferred embodiment, the server 3 providing the application service has to do nothing other than communicating with the image processing device 2 with which the server 3 works together to execute the job. It, therefore, does not require any changes to the server 3, and it may control the increase of the operation load in accompanying with the increased number of the party with which the server 3 communicates.

The detailed sequential procedure of the process performed on the image processing device 2 is described next. FIGS. 8, 9, 10, 11 and 12 are flow diagrams explaining exemplary sequential procedures of the process performed on the image processing device 2. The sequential procedures of the flow diagrams of FIGS. 8, 9, 10, 11 and 12 are performed in response to the execution of the program 20 by the above-described CPU 10a on the image processing device 2.

Figure 8:
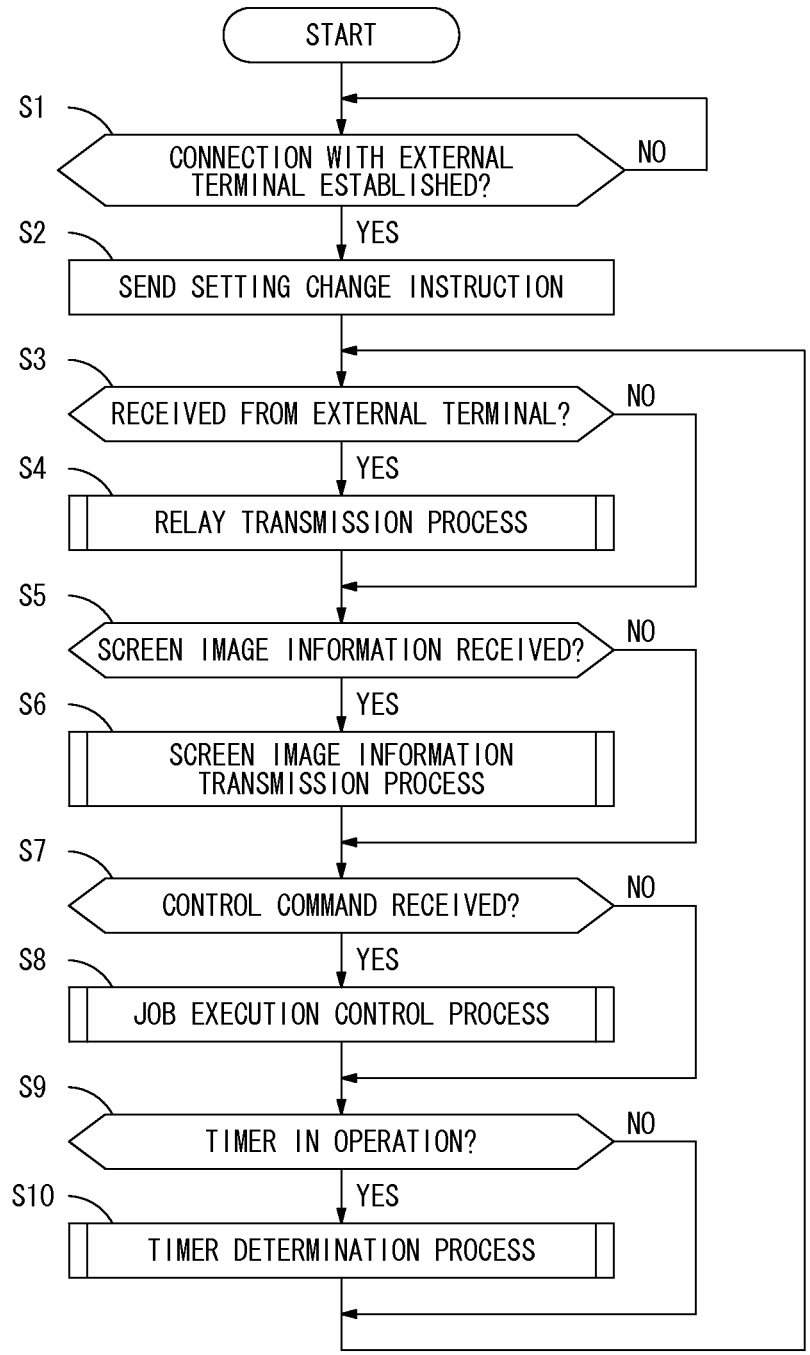
FIG. 8 is a flow diagram explaining an exemplary sequential procedure of the main process performed on the image processing device.

FIG. 8 is a flow diagram explaining an exemplary sequential procedure of the main process performed on the image processing device 2. Upon start of the process, the image processing device 2 determines whether or not the connection with the external terminal 5 is established (step S1). If the connection is established (when a result of step S1 is YES), the image processing device 2 moves on to the process in step S2 and later.

As the connection with the external terminal 5 is established, the image processing device 2 sends the setting change instruction to the external terminal 5 (step S2). The external terminal 5 registers the image processing device 2 as the relay server with the communication setting information 33 in response to the setting change instruction. After sending the setting change instruction, the image processing device 2 enters a loop process to perform the process in steps S3 to S10 repeatedly. This loop process is continued until the connection with the external terminal 5 is deleted, for example.

As entering the loop process, the image processing device 2 determines whether or not any information from the external terminal 5 is received (step S3). When the information is received from the external terminal 5 as a result of the determination when a result of step S3 is YES), the image processing device 2 performs a relay transmission process (step S4). When no information is received from the external terminal 5, the relay transmission process (step S4) is skipped.

The image processing device 2 then determines whether or not any screen image information is received over the network 4 (step S5). The screen image information thereby received is not only the screen image information 9 from the server 3, but also the screen image information from another server such as the web server. With the screen image information received (when a result of step S5 is YES), the image processing device 2 performs a screen image information transmission process (step S6). If there is no image information screen received, the screen image information transmission process (step S6) is skipped.

The image processing device 2 determines whether or not the control command based on the SOAP is received from the server 3 (step S7). When receiving the control command based on the SOAP from the server 3 (when a result of step S7 is YES), the image processing device 2 performs a job execution control process (step S8) based on the control command. Without any control command received from the server 3, the job execution control process (step S8) is skipped.

The image processing device 2 determines whether or not the timer 42a is in operation (step S9). When the timer 42a is in operation (when a result of step S9 is YES), the image processing device 2 performs a timer determination process (step S10). When the timer 42a is not in operation, the timer determination process (step S10) is skipped. Thereafter, the image processing device 2 repeatedly performs the process in steps S3 to S10 as described above.

Figure 9:
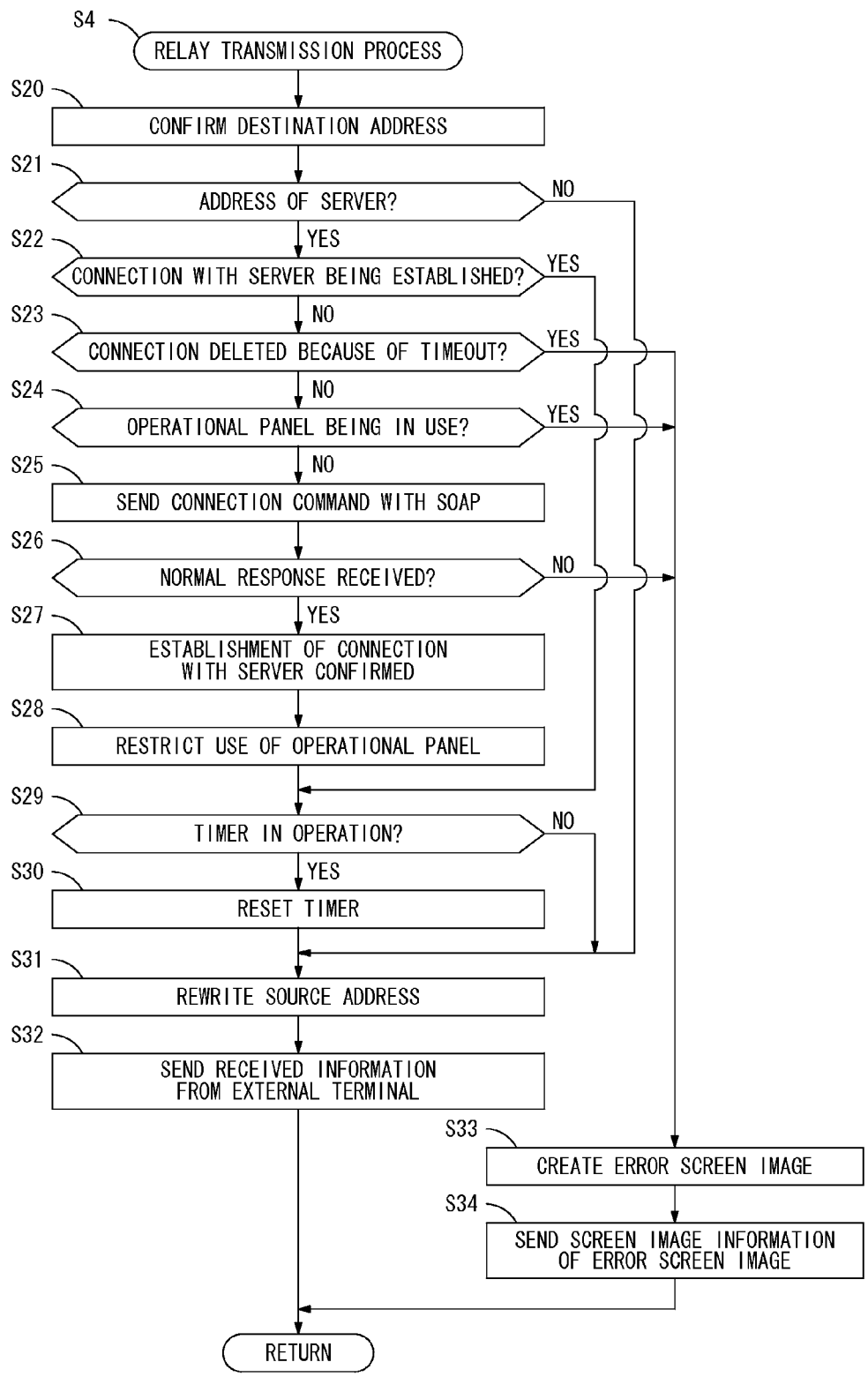
FIG. 9 is a flow diagram explaining in detail an exemplary sequential procedure of a relay transmission process.

FIG. 9 is a flow diagram explaining in detail an exemplary sequential procedure of the relay transmission process (step S4). With the information received from the external terminal 5, the image processing device 2 confirms the destination of the information (step S20) and determines whether or not the destination is the address of the server 3 (step S21). If the destination of the received information is not the server 3 with which the image processing device 2 works together to execute the job as a result of the determination (when a result of step S21 is NO), the image processing device 2 moves on to the process in step S31.

If the destination of the received information is the server 3 (when a result of step S21 is YES), the image processing device 2 determines whether or not the connection with the server 3 has already been established (step S22). When the connection with the server 3 has already been established (when a result of step S22 is YES), the image processing device 2 moves on to the process in step S29.

When the connection with the server 3 is yet to be established (when a result of step S22 is NO), the image processing device 2 determines whether or not the connection with the server 3 is deleted because of the timeout by the timer 42a (step S23). As the connection with the server 3 is deleted because of the timeout (when a result of step S23 is YES), the image processing device 2 moves on to the process in step S33.

As the connection is deleted because of a reason other than the timeout (when a result of step S23 is NO), the image processing device 2 determines whether or not another user is in use of the operational panel 13 at a point of the determination (step S24). This determination is made to prevent the instruction to execute the job in cooperation between the image processing device 2 and the server 3 from being given by the remote control from the external terminal 5 when another user is operating the operational panel 13. Thus, when another user is in use of the operational panel 13 (when a result of step S24 is YES), the image processing device 2 moves on to the process in step S33.

When no user is in use of the operational panel 13 (when a result of step S24 is NO), the image processing device 2 sends the connection command with the SOAP to the server 3 to establish the connection with the server 3 (step S25). The image processing device 2 then waits until receiving the reply from the server 3. In response to receipt of the reply from the server 3, the image processing device 2 determines if the reply is the normal response command (step S26). When the reply is not the normal response command (when a result of step S26 is NO), the image processing device 2 moves on to the process in step S33.

In response to receipt of the normal response command from the server 3 (when a result of step S26 is YES), the image processing device 2 confirms that the connection with the server 3 is successfully established (step S27). As establishing the connection with the server 3, the image processing device 2 restricts the use of the operational panel 13 in order to prevent the operational panel 13 from being operated by another user (step S28). The process in step S28 is performed by, for example, the above-described server connecting part 42.

The image processing device 2 then determines whether or not the timer 42a is in operation (step S29). When the timer 42a is in operation, the image processing device 2 stops measurement by the timer 42a and resets the measured time (step S30). When the timer 42a is not in operation, the process in step S30 is skipped.

The image processing device 2 rewrites the source address contained in the received information from the external terminal 5 from the address of the external terminal 5 to the address of the image processing device 2 (step S31). The image processing device 2 sends the updated received information with the rewritten address over the network 4 (step S32).

When a result of step S23 is YES, a result of step S24 is YES or a result of step S26 is NO, the image processing device 2 creates the error screen image corresponds to the situation (step S33) and sends the created screen image information corresponds to the error screen image to the external terminal 5 (step S34). Thus, the relay transmission process (step S4) is complete.

Figure 10:
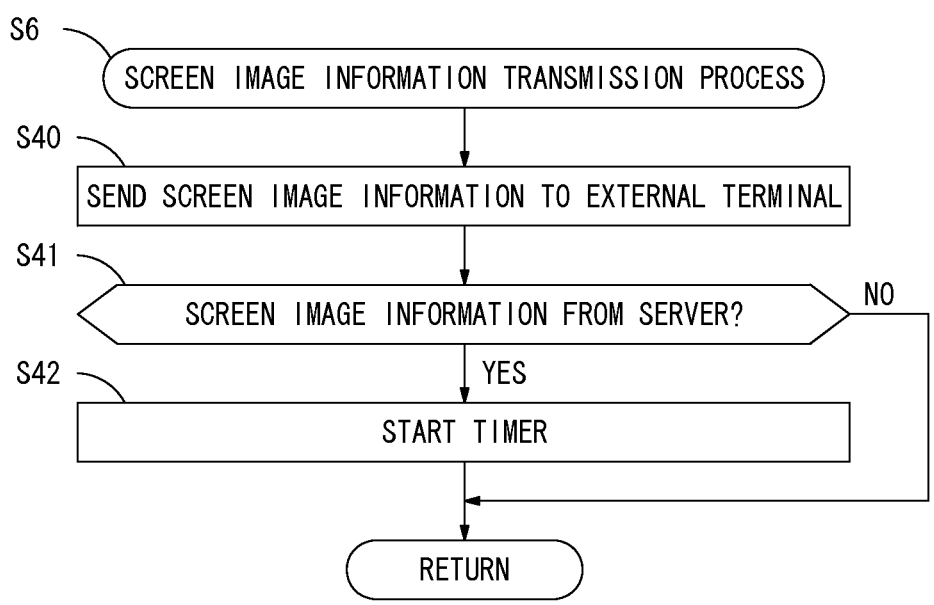
FIG. 10 is a flow diagram explaining in detail an exemplary sequential procedure of a screen image information transmission process.

FIG. 10 is a flow diagram explaining in detail an exemplary sequential procedure of the screen image information transmission process (step S6). With the screen image information received over the network 4, the image processing device 2 outputs the received screen image information to the external terminal 5 (step S40). The image processing device 2 determines whether or not the screen image information output to the external terminal 5 is the screen image information 9 received from the server 3 (step S41). When the output information is the screen image information 9 received from the server 3 (when a result of step S41 is YES), the image processing device 2 causes the timer 42a to start measuring a time (step S42). When, on the other hand, the received screen image information is not from the server 3 and is the one received from another server such as the web server (when a result of step S41 is NO), the process in step S42 is skipped. Thus, the whole process of the screen image information transmission process (step S6) is complete.

Figure 11:
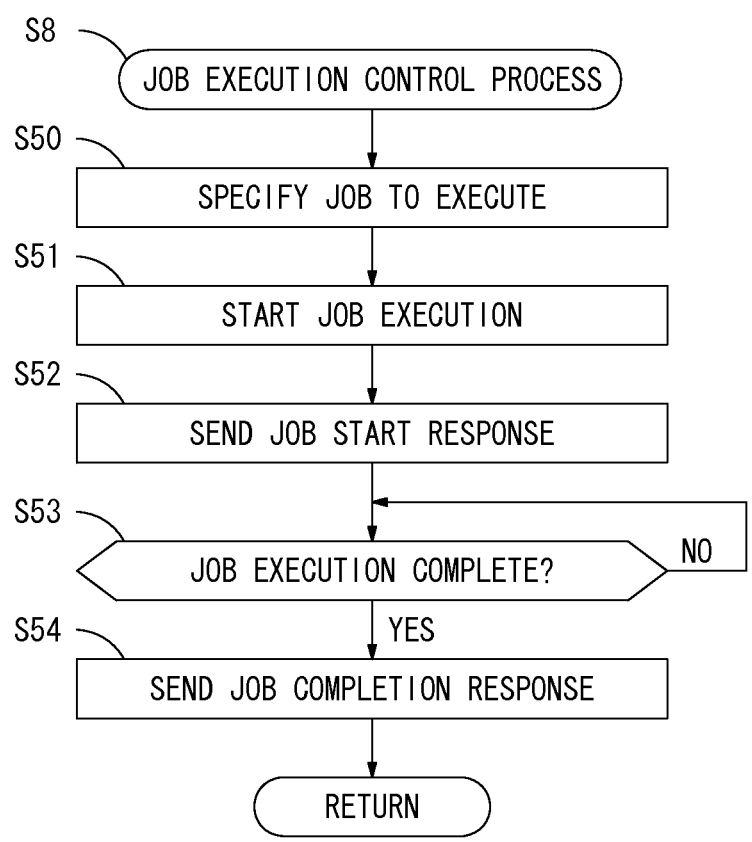
FIG. 11 is a flow diagram explaining in detail an exemplary sequential procedure of a job execution control process.

FIG. 11 is a flow diagram explaining in detail an exemplary sequential procedure of the job execution control process (step S8). In response to receipt of the control command from the server 3, the image processing device 2 specifies the job to execute based on the control command (step S50). The image processing device 2 then starts execution of the specified job (step S51) and sends the job start response with the SOAP command to the server 3 (step S52). The image processing device 2 then waits until execution of the job is complete (step S53). As execution of the job is complete, the image processing device 2 sends to the server 3 the job completion response with the SOAP command (step S54). Thus, the whole process of the job execution control process (step S8) is complete.

The job execution control process (step S8) described in FIG. 11 is performed every time the image processing device 2 receives the control command with the SOAP from the server 3. As receiving the control command giving the instruction to start execution of the job from the server 3, for instance, the job execution control process (step S8) is performed, and the scan job is executed on the image processing device 2. The image processing device 2 receives the control command giving the instruction to the server 3 to start execution of the data transmission job that sends the image data generated by the scan job from the server 3. In response to the receipt of the control command, the job execution control process (step S8) is performed again, so that the job that sends the image data to the server 3 is executed on the image processing device 2. The image processing device 2 repeatedly performs the job execution control process (step S8) in response to the control command from the server 3, thereby executing the job in cooperation with the server 3.

Figure 12:
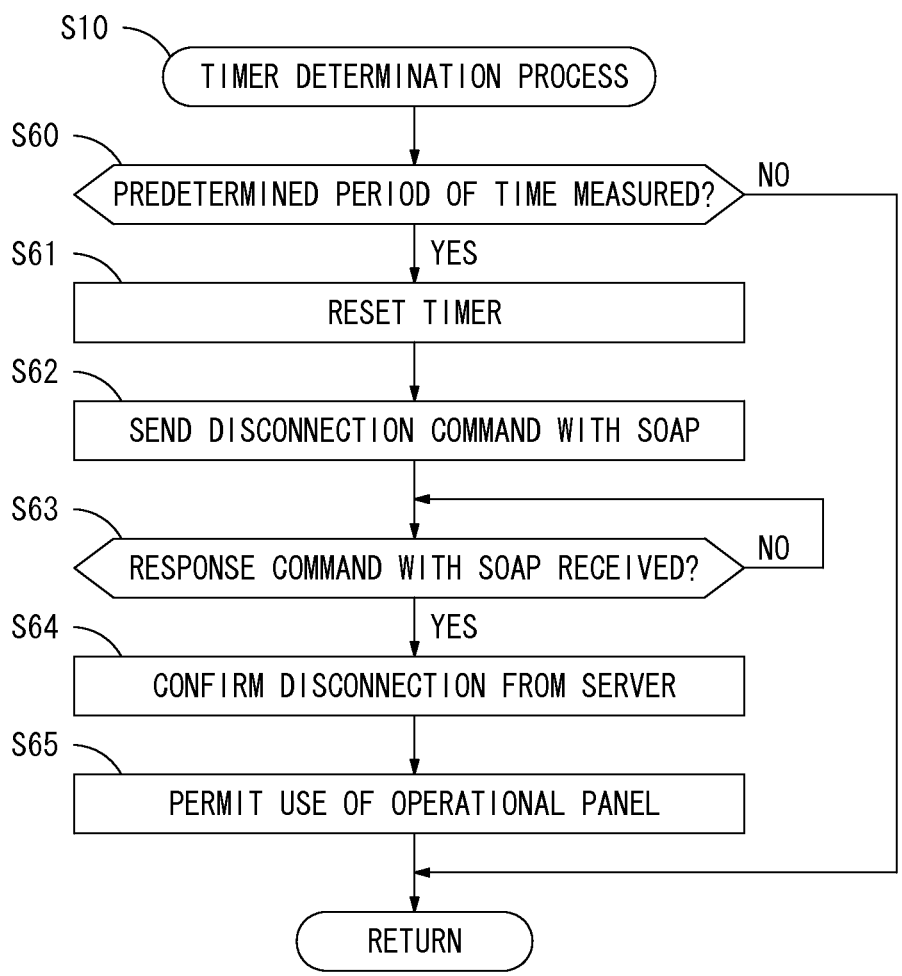
FIG. 12 is a flow diagram explaining in detail an exemplary sequential procedure of a timer determination process.

FIG. 12 is a flow diagram explaining in detail an exemplary sequential procedure of the timer determination process (step S10). When the timer 42a is in operation, the image processing device 2 determines whether or not the predetermined period of time is measured by the timer 42a (step S60). If the measured time is less than the predetermined period of time (when a result of step S60 is NO), the timer determination process is immediately complete.

If the predetermined period of time is measured by the timer 42a (when a result of step S60 is YES), the image processing device 2 stops the timer 42a measuring the time and resets the measured time (step S61). The image processing device 2 sends the disconnection command with the SOAP to the server 3 (step S62). After sending the command, the image processing device 2 waits until receiving the response command with the SOAP from the server 3 (step S63). After receiving the response command from the server 3, the image processing device 2 confirms that the connection with the server 3 is successfully disconnected (step S64). The image processing device 2 returns the operational panel 13 to available state (step S65). Thus, the whole process of the timer determination process (step S10) is complete.

With execution of the above-described process by the image processing device 2, the user is allowed to make operation as to the job executed in cooperation between the image processing device 2 and the server 3 through the external terminal 5 on the image processing system 1 of the present preferred embodiment. The image processing device 2 and the server 3 work together to proceed the process based on the user's instruction operating the external terminal 5, thereby executing the job specified by the user.

The image processing device 2 of the present preferred embodiment is configured to establish the connection which allows the communication with the external terminal 5 and relay the information from the external terminal 5 to the network 4. With the relay function, the image processing device 2 is capable of receiving the response to the information from the external terminal 5 over the network 4 after sending the information over the network 4.

When receiving the access request to the server 3 from the external terminal 5, the image processing device 2 sends and receives the control command with the SOAP which may not be figured out by the external terminal 5 from the server 3 to conduct negotiations to execute the job, thereby establishing the connection which allows the communication with the server 3. The image processing device 2 rewrites the source address contained in the information received from the external terminal 5 to the address of the image processing device 2 and sends the updated information to the server 3. Thus, the server 3 is allowed to identify the image processing device 2 as the source of the received information and perform the process based on the received information normally.

The image processing device 2 outputs the screen image information 9 to the external terminal 5 in response to receipt of the screen image information 9 from the server 3. So, the user of the external terminal 5 is allowed to check the operation screen output from the server 3 and give a variety of instructions to the server 3 normally by making operation to the operation screen.

As receiving the control command based on the negotiation from the server 3 while the connection with the server 3 is established, the image processing device 2 starts execution of the job in cooperation with the server 3 based on the received control command. With the image processing device 2 of the present preferred embodiment, the user is allowed to make the image processing device 2 and the server 3 work together to execute the job using the external terminal 5 without any changes to the server 3 that provides the application service. As a result, user-friendliness of the image processing system 1 may be improved without reduction of the operation efficiency of the server 3.

Once the connection with the external terminal 5 is established, the image processing device 2 of the present preferred embodiment is configured to automatically change the communication settings on the external terminal 5 to communicate via the image processing device 2. The user of the external terminal 5, therefore, is required to only make the external terminal 5 connect with the image processing device 2. The user is not necessary to make other operations by manual such as change of settings. The operation load on the user may be reduced.

The image processing device 2 of the present preferred embodiment stores in advance the address to access the server 3 as the server registration information 22. If the address contained in the access request received from the external terminal 5 matches the address of the server 3 registered as the server registration information 22, the image processing device 2 establishes connection with the server 3. In other words, when the access request from the external terminal 5 is the one to another server other than the server 3, the image processing device 2 does not establish connection with the server 3. Only when the user of the external terminal 5 wishes the cooperation between the image processing device 2 and the server 3, the image processing device 2 is allowed to establish connection with the server 3. When not establishing connection with the server 3, the image processing device 2 serves only as a normal proxy server which does not execute the job in cooperation with the server 3.

When establishing connection with the server 3, the image processing device 2 of the present preferred embodiment sends and receives the SOAP command from the server 3, thereby conducting negotiations to execute the job in cooperation with the server 3. The server 3 is allowed to identify in advance that the destination is the image processing device 2 which is allowed to execute in cooperation with itself. So, the connection with the image processing device 2 is permitted. With the negotiations conducted in advance, the image processing device 2 may establish connection with the server 3 successfully.

Sometimes, the predetermined period of time elapses before the image processing device 2 of the present preferred embodiment receives from the external terminal 5 the information to send to the server 3 while connection with the server 3 is established. In such a case, the image processing device 2 automatically deletes the connection with the server 3. As a result, it may prevent from leaving multiple applications running on the server 3. The operation load on the server 3 may be reduced.

After automatically deleting the connection with the server 3, the image processing device 2 of the present preferred embodiment may receive the information from the external terminal 5 to send to the server 3. In this case, the image processing device 2 outputs the error screen image information to the external terminal 5. So, the user of the external terminal 5 is allowed to know the connection with the server 3 is automatically deleted because of the timeout, and he or she can deal with the situation by taking appropriate action such as reestablishing the connection with the image processing device 2.

The image processing device 2 of the present preferred embodiment switches the operational panel 13 to unavailable for the other users in response to establishment of connection with the server 3. This may prevent the image processing device 2 from being used by another user while the user of the external terminal 5 is trying to make the image processing device 2 and the server 3 work together to execute the job.

As described above, the image processing device is capable of relaying the information output from the external terminal 5 to the server, and the server is capable of processing the received information as the information from the image processing device. Also, the image processing device and the server are allowed to send and receive the control command normally therebetween. This allows the image processing device and the server to work together to execute the job through the external terminal without any changes to the server which provides the application service.

(Modifications)

While the preferred embodiment of the present invention has been described above, the present invention is not limited to the preferred embodiment. Various modifications may be applied to the present invention.

In the present preferred embodiment described above, the image processing device 2 is shown to be one of MFPs with multiple functions such as copy function, scan function, print function, FAX function and BOX function. The image processing device 2 is not necessarily the device such as the MFPs. To be more specific, image processing device 2 may be a device with single function such as devices including a scanner with only scan function or a printer with only print function. Even when image processing device 2 is such a device with single function, it works together with the server 3 to execute the job, thereby executing more kinds of jobs than executing on its own.

In the above-described present preferred embodiment, the external terminal 5 is formed from a portable terminal such as a smart phone or a tablet terminal as an example. The external terminal 5 is, however, not necessarily such portable terminal. A personal computer (PC) connected to the network 4, for example, may be used as the above-described external terminal 5.

What is claimed is:

1. An image processing device capable of executing a job in cooperation with a server connected through a network, comprising:
    an external terminal connecting part for establishing connection that allows communication with an external terminal;
    a server connecting part for conducting a negotiation to execute the job in cooperation with said server and establishing connection that allows communication with said server in response to receipt from said external terminal of an access request to said server while connection with said external terminal is established;
    a transmission part for sending information that is received from said external terminal and addressed to said server after rewriting a source address of the information to an address of said image processing device while connection with said server is established;
    a screen image control part for outputting screen image information to said external terminal in response to receipt of the screen image information from said server while connection is established with said server;
    a job execution control part for starting execution of the job in cooperation with said server in accordance with a control command based on said negotiation after receiving the control command from said server while connection is established with said server;
    a setting changing part for changing communication settings on said external terminal to communicate via said image processing device once connection with said external terminal is established by said external terminal connecting part; and
    a storage part for storing therein an address to access said server, wherein
    said server connecting part establishes connection with said server when the address contained in the access request received from said external terminal matches the address of said server stored in said storage part.

2. The image processing device according to claim 1, wherein
    said server connecting part sends and receives SOAP command from said server, thereby conducting said negotiation to execute the job in cooperation with said server.

3. The image processing device according to claim 1, further comprising:
    a timer for measuring a time that elapses before receiving from said external terminal the information to send to said server while connection with said server established, wherein
    said server connecting part deletes connection with said server when a predetermined period of elapsed time is measured by said timer.

4. The image processing device according to claim 3, wherein
    said screen image control part outputs error screen image information to said external terminal when the information to send to said server is received from said external terminal after connection with said server is deleted by said server connecting part.

5. The image processing device according to claim 1, further comprising:
    an operational panel for receiving user's instruction, wherein
    said server connecting part switches said operational panel to unavailable as establishing the connection with said server.

6. An image processing system comprising an image processing device and a server that work together to execute a job, said image processing device and said server being connected together through a network, wherein
- said image processing device establishes connection that allows communication with an external terminal and sends information addressed to said server from said external terminal to said server after rewriting a source address of the information to an address of said image processing device,
- said server sends screen image information to operate the job to said image processing device based on the information received from said image processing device, and sends a control command to execute the job in cooperation with said image processing device to said image processing device based on the information received from said image processing device,
- said image processing device outputs the screen image information to said external terminal in response to receipt of the screen image information from said server, and starts executing the job in cooperation with said server in accordance with the control command after receiving the control command from said server,
- said image processing device changes communication settings on said external terminal to communicate via said image processing device once connection with said external terminal is established,
- said image processing device includes a storage part for storing an address to access said server, and
- said image processing device establishes connection with said server when an address contained in an access request received from said external terminal matches the address of said server stored in said storage part.

7. The image processing system according to claim 6, wherein
- said image processing device conducts a negotiation to execute the job in cooperation with said server by sending and receiving SOAP command from said server and establishes connection with said server.

8. An image processing method of executing a job in cooperation with a server, comprising the steps of:
- (a) establishing connection that allows an image processing device to communicate with an external terminal;
- (b) changing communication settings on said external terminal to communicate via said image processing device once connection with said external terminal is established;
- (c) conducting a negotiation to execute the job in cooperation with said server and establishing connection that allows communication with said server in response to receipt from said external terminal of an access request to said server while connection with said external terminal is established;
- (d) sending information that is received from said external terminal and addressed to said server after rewriting a source address of the information to an address of said image processing device while connection with said server is established;
- (e) outputting screen image information to said external terminal in response to receipt of the screen image information from said server while connection with said server is established;
- (f) starting execution of the job in cooperation with said server in accordance with a control command based on said negotiation after receiving the control command from said server while connection with said server is established; and
- (g) storing in advance an address to access said server, wherein
- in said step (c), connection with said server is established when an address contained in an access request received from aid external terminal matches the address of said server stored in advance in said step (g).

9. A non-transitory computer readable recording medium on which a program is recorded, said program being executable on an image processing device that executes a job in cooperation with a server connected through a network, said program causing said image processing device to execute the steps of:
- (a) establishing connection that allows communication with an external terminal;
- (b) changing communication settings on said external terminal to communicate via said image processing device once connection with said external terminal is established;
- (c) conducting a negotiation to execute the job in cooperation with said server and establishing connection that allows communication with said server in response to receipt from said external terminal of an access request to said server while connection with said external terminal is established;
- (d) sending information that is received from said external terminal and addressed to said server after rewriting a source address of the information to an address of said image processing device while connection with said server is established;
- (e) outputting screen image information to said external terminal in response to receipt of the screen image information from said server while connection with said server is established;
- (f) starting execution of the job in cooperation with said server in accordance with a control command based on said negotiation after receiving the control command from said server while connection with said server is established; and
- (g) storing in advance an address to access said server, wherein
- in said step (c), connection with said server is established when an address contained in an access request received from said external terminal matches the address of said server stored in advance in said step (g).

10. The non-transitory computer readable recording medium according to claim 9, wherein
- in said step (c), a negotiation to execute the job in cooperation with said server is conducted by sending and receiving SOAP command from said server and connection with said server is established.

* * * * *